(12) United States Patent
Howarter et al.

(10) Patent No.: US 8,418,194 B2
(45) Date of Patent: Apr. 9, 2013

(54) SYSTEM AND METHOD FOR DYNAMIC BANDWIDTH ALLOCATION

(75) Inventors: Jamie C. Howarter, Overland Park, KS (US); Charles M. Lesher, Louisburg, KS (US); Douglas B. Ceballos, Olathe, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 514 days.

(21) Appl. No.: 11/897,835

(22) Filed: Aug. 31, 2007

(65) Prior Publication Data

US 2009/0064252 A1    Mar. 5, 2009

(51) Int. Cl.
*H04H 60/32*    (2008.01)
*H04N 7/18*    (2006.01)
*H04N 7/173*    (2011.01)
*H04N 7/16*    (2011.01)

(52) U.S. Cl.
USPC ................ 725/14; 725/81; 725/130; 725/142

(58) Field of Classification Search .................... 725/130
See application file for complete search history.

(56) References Cited

U.S. PATENT DOCUMENTS

| | | | |
|---|---|---|---|
| 5,712,969 A | 1/1998 | Zimmermann et al. |
| 5,768,539 A | 6/1998 | Metz et al. |
| 5,801,753 A | 9/1998 | Eyer et al. |
| 5,894,320 A | 4/1999 | Vancelette |
| 5,920,701 A | 7/1999 | Miller et al. |
| 5,931,908 A | 8/1999 | Gerba et al. |
| 5,940,072 A | 8/1999 | Jahanghir et al. |
| 5,960,445 A | 9/1999 | Tamori et al. |
| 5,978,855 A | 11/1999 | Metz et al. |
| 6,032,134 A | 2/2000 | Weissman |
| 6,040,851 A | 3/2000 | Cheng et al. |
| 6,046,760 A | 4/2000 | Jun |
| 6,075,863 A | 6/2000 | Krishnan et al. |
| 6,088,051 A | 7/2000 | Barraud |
| 6,088,330 A | 7/2000 | Bruck et al. |
| 6,138,271 A | 10/2000 | Keeley |
| 6,175,861 B1 | 1/2001 | Williams, Jr. et al. |
| 6,195,797 B1 | 2/2001 | Williams, Jr. |
| 6,202,211 B1 | 3/2001 | Williams, Jr. |
| 6,246,434 B1 | 6/2001 | Takashima |
| 6,256,785 B1 | 7/2001 | Klappert et al. |
| 6,259,443 B1 | 7/2001 | Williams, Jr. |
| 6,321,078 B1 | 11/2001 | Menelli et al. |
| 6,331,876 B1 | 12/2001 | Koster et al. |
| 6,347,294 B1 | 2/2002 | Booker et al. |
| 6,424,947 B1 | 7/2002 | Tsuria et al. |
| 6,469,742 B1 | 10/2002 | Trovato et al. |
| 6,614,470 B1 | 9/2003 | Manowitz et al. |

(Continued)

OTHER PUBLICATIONS

Non-Final Rejection date mailed Sep. 10, 2009 in U.S. Appl. No. 11/803,882.

(Continued)

*Primary Examiner* — Chris Parry
(74) *Attorney, Agent, or Firm* — Swanson & Bratschun, L.L.C.

(57) ABSTRACT

A system and method for conserving bandwidth for a data connection. A television is detected to have been turned off. Recording information is requested from a digital video record. A content stream to the digital video recorder and the television is terminated in response to receiving the recording information and determining the DVR is inactive.

21 Claims, 6 Drawing Sheets

U.S. PATENT DOCUMENTS

| | | | |
|---|---|---|---|
| 6,618,754 B1 | 9/2003 | Gosling | |
| 6,637,029 B1 | 10/2003 | Maissel et al. | |
| 6,654,835 B1 | 11/2003 | Foster et al. | |
| 6,681,393 B1 | 1/2004 | Bauminger et al. | |
| 6,684,403 B1 | 1/2004 | Barraud | |
| 6,738,983 B1 | 5/2004 | Rao et al. | |
| 6,895,595 B2 | 5/2005 | Goodman et al. | |
| 6,970,641 B1 | 11/2005 | Pierre et al. | |
| 6,975,594 B1 | 12/2005 | Byers | |
| 7,003,783 B2 | 2/2006 | Skaringer et al. | |
| 7,027,768 B2 | 4/2006 | Hill | |
| 7,042,516 B2 | 5/2006 | Moriya et al. | |
| 7,069,578 B1 | 6/2006 | Prus et al. | |
| 7,072,950 B2 | 7/2006 | Toft | |
| 7,124,194 B2 | 10/2006 | Nathan et al. | |
| 7,200,683 B1 | 4/2007 | Wang et al. | |
| 7,222,293 B1 | 5/2007 | Zapiec et al. | |
| 7,353,212 B1 | 4/2008 | Darcy et al. | |
| 7,397,763 B2 | 7/2008 | Bradd | |
| 7,492,758 B2 | 2/2009 | Kusnitz et al. | |
| 7,587,124 B2 * | 9/2009 | Horiuchi et al. | 386/69 |
| 7,587,512 B2 | 9/2009 | Ta et al. | |
| 7,739,718 B1 * | 6/2010 | Young et al. | 725/127 |
| 7,782,884 B2 | 8/2010 | Kerr et al. | |
| 2002/0069420 A1 | 6/2002 | Russell et al. | |
| 2003/0074662 A1 | 4/2003 | Istvan et al. | |
| 2005/0015806 A1 * | 1/2005 | Patel | 725/81 |
| 2005/0073518 A1 * | 4/2005 | Bontempi | 345/211 |
| 2005/0175181 A1 | 8/2005 | Bergs et al. | |
| 2006/0031888 A1 * | 2/2006 | Sparrell | 725/78 |
| 2006/0064730 A1 * | 3/2006 | Rael et al. | 725/95 |
| 2006/0114360 A1 * | 6/2006 | Kortum et al. | 348/730 |
| 2006/0225106 A1 * | 10/2006 | Bedingfield, Sr. | 725/95 |
| 2007/0044119 A1 * | 2/2007 | Sullivan et al. | 725/9 |
| 2007/0061830 A1 * | 3/2007 | Chang | 725/9 |
| 2007/0214076 A1 | 9/2007 | Robida et al. | |
| 2007/0220577 A1 * | 9/2007 | Kongalath | 725/131 |
| 2007/0283397 A1 | 12/2007 | Scholl | |
| 2008/0049787 A1 | 2/2008 | McNaughton et al. | |
| 2008/0104202 A1 * | 5/2008 | Barrett et al. | 709/219 |
| 2008/0263621 A1 * | 10/2008 | Austerlitz et al. | 725/139 |
| 2008/0288991 A1 | 11/2008 | Smoyer et al. | |
| 2009/0064252 A1 | 3/2009 | Howarter et al. | |
| 2009/0141735 A1 * | 6/2009 | Kolhi | 370/432 |
| 2009/0234996 A1 | 9/2009 | Bugenhagen | |
| 2009/0248864 A1 | 10/2009 | Bugenhagen | |
| 2009/0257359 A1 | 10/2009 | Bugenhagen | |
| 2010/0002723 A1 | 1/2010 | Kerr et al. | |

OTHER PUBLICATIONS

Response filed Sep. 30, 2009 to Sep. 10, 2009 Non-Final Action in U.S. Appl. No. 11/803,882.

Final Rejection date mailed Nov. 9, 2009 in U.S. Appl. No. 11/803,882.

Edell et al., Providing Internet Access: What we learn from the INDEX Trial, INDEX Project Report # 99-010W, 18 pages, Apr. 1999.

Ricciato et al., Routing Demands with time-varying bandwidth profiles on a MPLS network, Computer Networks, 15 pages, Aug. 2004.

U.S. Appl. No. 12/168,327; Issue Notification dated Aug. 4, 2010; 1 page.

U.S. Appl. No. 12/168,327; Non-Final Rejection dated Apr. 14, 2010; 9 pages.

U.S. Appl. No. 12/168,327; Notice of Allowance dated Jun. 11, 2010; 7 pages.

U.S. Appl. No. 11/803,882; Final Rejection dated Jun. 21, 2010; 17 pages.

U.S. Appl. No. 11/803,882; Non-Final Rejection dated Sep. 10, 2009; 13 pages.

* cited by examiner

SYSTEM AND METHOD FOR DYNAMIC BANDWIDTH ALLOCATION

BACKGROUND

Internet protocol Television (IPTV) describes a system where a digital television service is delivered using Internet protocol (IP) over a network. The network used for IPTV may include the public Internet or a private IP network controlled by an IPTV service provider via a broadband connection known as digital subscriber lines (DSL), where a digital subscriber line typically includes conventional telephone lines with copper wire into households. Alternatively, the digital subscriber may be fiber to the premises (FTTP). Telecommunication service provider companies that have begun offering DSL have limited bandwidth resources when delivering video over existing copper wire infrastructures.

In order for the telephone service providers to compete with the new bundled services offered by cable companies, they must provide customers with an alternative bundling of services, including video services. Today, most telephone access networks provide broadband Internet access by using DSL technology. Because the technology involves connecting copper wire from the central office to the customers, bandwidth is limited based on the distance, interference, and physical bandwidth limitations of copper wire. In order for telephone service providers to offer video over their existing copper wire infrastructures, they must deliver entertainment services, such as IPTV, using existing DSL technology. However, even with the use of IPTV technology, bandwidth limitations over copper wire infrastructure still impacts the overall service capability of the telecommunications service provider.

SUMMARY

Certain embodiments of the present invention address the problem of current's networks maintenance of a content stream to the set-top box, even when a television is turned off, which uses bandwidth that may be better utilized. This continued communication of the IPTV channel causes the video bandwidth to remain active over the DSL access line and may impact bandwidth utilization of a telecommunications transport network. Because all facets of communication systems have limited bandwidth, especially those associated with copper lines, continuing to deliver IPTV channels to a subscriber who is no longer watching the television wastes bandwidth that could otherwise be utilized for the same or other subscribers using IPTV, Internet, or other data services. Accordingly, certain embodiments of the present invention control bandwidth for IPTV systems over DSL lines and other communication systems.

One embodiment includes a system and method for conserving bandwidth for a data connection. A television is detected to have been turned off. Recording information is requested from a digital video record. A content stream to the digital video recorder and the television is terminated in response to receiving the recording information and determining the DVR is inactive.

Another embodiment includes an IPTV set-top box for preserving bandwidth. The IPTV set-top box may include a transceiver configured to receive a content stream from a service provider and format the content stream for display by a television. The IPTV set-top box may further include a DVR configured to record programs from the content stream as specified by a user. The IPTV set-top box may further include an interface application configured to request recording information from the digital video recorder. The interface application sends a message to terminate the content stream to the set-top box in response to determining the television is turned off and further in response to the recording information being associated with inactivity of the DVR. The IPTV set-top box may further include a power control operable to initiate a passive mode of the set-top box in response to sending the message to terminate the content stream.

Yet another embodiment includes an IPTV set-top box for preserving bandwidth. The IPTV set-top box may include a processor for executing a set of instructions. The IPTV set-top box may further include a memory for storing the set of instructions. The set of instructions may be configured to detect a television has been turned off, request recording information from a digital video recorder, terminate a content stream to the DVR and the television in response to receiving the recording information determining the DVR is inactive, and reenable the content stream to the DVR in response to determining a program is set to record at a current time.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Illustrative embodiments provide a system, method, and device for dynamic bandwidth allocation. In particular, a set-top box may be used to determine whether a television and corresponding IPTV connection is active or should be active for use by a digital video recorder (DVR) or personal video recorder (PVR). In response to determining the television is inactive or has been powered down, the set-top box determines whether the DVR is recording or the next time it is set to record. If the connection is not needed for the DVR, the set-top box cancels or ends the content stream to preserve bandwidth. The content stream is reestablished based on scheduled DVR recording times. As a result, bandwidth through a home connection, such as a network connection, is preserved for other uses or other customers.

Figure 1:
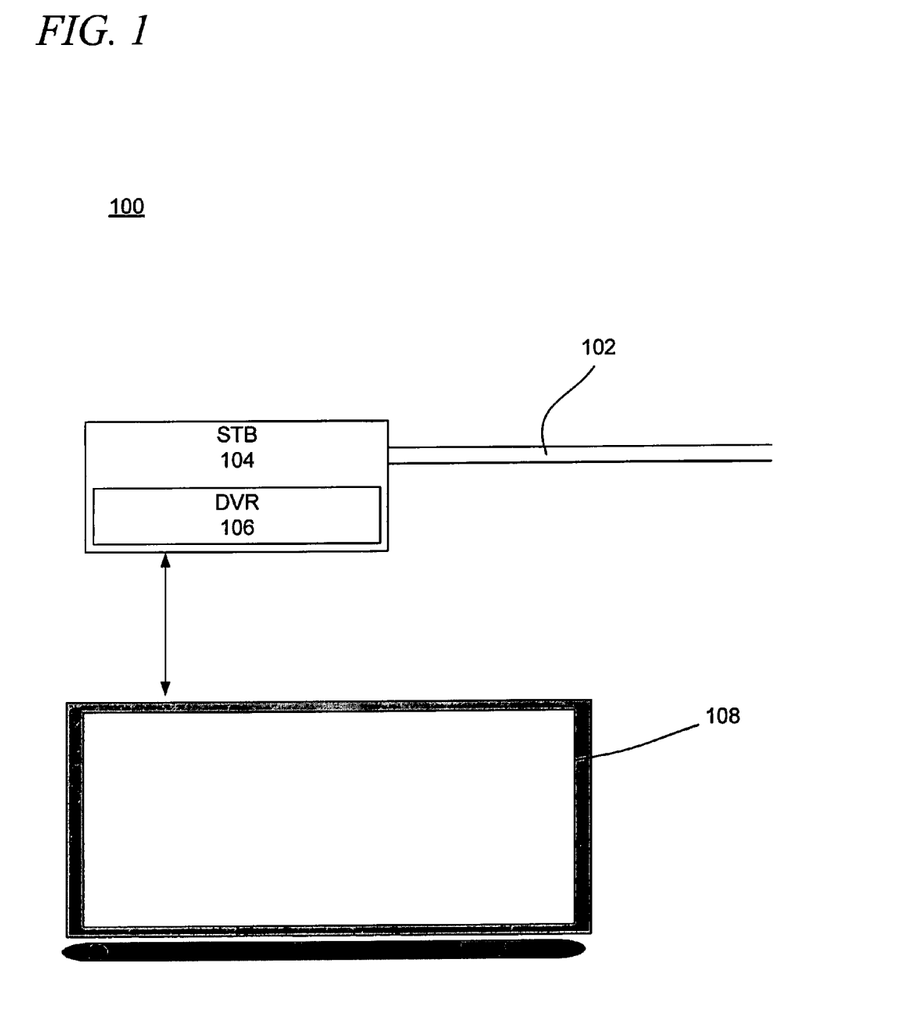
FIG. 1 is an illustrative diagram of a IPTV system in accordance with an illustrative embodiment.

FIG. 1 is an illustrative diagram of an IPTV system in accordance with an illustrative embodiment. FIG. 1 illustrates one embodiment of an IPTV environment 100. The IPTV environment 100 may include a network connection 102, a set-top box 104, a DVR 106 and a television 108. Expanded illustrations of the IPTV environment 100 are further illustrated in FIGS. 2 and 3. The set-top box 104 is further described by FIG. 4.

As shown, the network connection 102 provides a content stream including video, data, media, and other interactive content to the television 108. In one embodiment, the network connection 102 may be a DSL connection. However, the data or media connection to the set-top box 104 may be provided by any connection suitable for transmitting data, video, broadband, or other media content. The network connection 102 as a DSL connection may be particularly relevant because of the large number of homes already wired with a twisted copper pair, typically used for plain old telephone service. The network connection 102 may have limited bandwidth in order to operate and supply digital content to the devices of the IPTV environment 100.

The content stream through the network connection 102 may be a unicast broadcast intended only for the set-top box 104 and the corresponding user or it may be a multicast broadcast being simultaneously received and processed by a number of set-top boxes. The content stream may be a high-definition or regular digital broadcast sent and received from any number of networks, servers, advanced intelligent devices, or other networks or components. The content stream available through the network connection 102 may be established with IPTV network components by sending an add stream or stream origination request. The add stream request may be a message or command sent from the set-top box 104 that requests a content stream for a specified channel video-on-demand, program or other media content. The add stream request may be authenticated based on information, passwords, or other identifiers sent by the set-top box 104.

In one embodiment, the DVR 106 is integrated with the set-top box 104. The set-top box 104 allows a user to receive digital television service through the network connection 102 using Internet Protocol over a network infrastructure. The set-top box 104 may be a device that functions as a translator or intermediary between the television 108 and the network connection 102. The set-top box 104 may convert, format, or translate the signal received through the network connection 102 to be displayed on the screen of the television 108.

In the IPTV environment 100, the set-top box 104 may be a computer or computing device providing communications on an IP network and decoding the video streaming media for display by the television 108. The DVR 106 may be a device that records video in a digital format to a disk drive or other memory medium. The set-top box 104 and DVR 106 may include a processor, memory, and other common computing elements. The set-top box 104 allows a user to specify and change the content stream streamed through the network connection 102 to the television 108.

In particular, the set-top box 104 and DVR 106 may store and/or execute programs, operating systems, or instructions for controlling the media content, playback user interaction, and other interactive features available to a user through the television 108. The DVR 106 may enable a user to capture video, media, or other content for playback from a disk or a memory of the DVR 106. The DVR 106 may provide the user with the ability to record programs, features, or other media for play back at the user's convenience. In most cases, the DVR 106 may store the digital stream from the network connection 102 directly to disk or playback at a specified time.

The user may set preferences in the set-top box 104 or DVR 106 for automatically or manually selecting and recording programs. For example, the user may specify that the DVR 106 is to record every program of a specified type that is available through the channels or contents stream of the network connection 102. In another example, the user may set the DVR 106 to record a one-time event or a single program. For example, the user may use an infrared remote or cellular telephone to change channels and record programs. The user may interact with the set-top box 104, DVR 106, and television 108 using one or more remote control devices. The set-top box 104 may include any number of buttons, indicators, displays, touch screens, or other interactive elements for receiving user input and providing information to the user.

The set-top box 104 and DVR 106 may communicate with or be connected to the television 108 through a hard-wired or wireless connection. In one embodiment, the set-top box 104 and television 108 may communicate through a high-definition multi media interface (HDMI). However, the connection may be any digital audio/video interface suitable for transmitting and/or compressing media streams. The set-top box 104 and television 108 may use any number of digital connection or analog standards and converters to send and receive information.

In another embodiment, the set-top box 104 and television 108 may communicate through a wireless connection, such as Bluetooth® or WiFi, such as IEEE 802.11(n). The connection between the set-top box 104 and the television 108 may be used to carry video, audio, and other device controlling signals. Other wireless standards and protocols may be similarly used to allow the set-top box 104 and television 108 to communicate in different rooms or locations.

In one embodiment, the set-top box 104 may be able to determine that the television 108 is turned on, activated, or set to display content. For example, the power control of the television 108 may be plugged into the set-top box 104. The set-top box 104 may use a current detector or other suitable device to determine whether the television 108 is activated or otherwise enabled to display visual content.

In another embodiment, the television 108 may send a heartbeat signal indicating status to the set-top box. The television 108 may also proactively send a signal or message to the set-top box 104 when activated or deactivated. As a result, the set-top box 104 may be able to determine whether the television 108 is being actively used or is still enabled. A power determination chipset within the set-top box 104 may monitor the status of the television 108 to determine whether the television is active or powered up.

In another embodiment, the content provided through the network connection 102 may establish whether the television 108 is active. For example, the user may use any number of remote control devices to control the set-top box 104 and DVR 106, as well as the television 108. In response to receiving a signal to turn off the television 108, the set-top box 104 may transmit a drop or terminate signal to an IPTV content server through the network connection 102. As a result, the signal sent from IPTV network resources through the network connection 102 from that point on may indicate that the television 108 is inactive.

In another example, a chipset residing in the television 108 may send a signal to the set-top box 104 indicating that the power has been turned off. The signal may be received through a wire line or a wireless connection between the set-top box 104 and the television 108.

In addition to those examples described for the IPTV environment 100, the set-top box 104 may use any number of methods for determining whether the television 108 is active. Once the set-top box 104 determines the television 108 has been turned off or powered down, the set-top box 104 reads the DVR 106 to determine whether a television show or other program is set to record or is currently recording. If a show is currently recording, the network connection 102 remains active and the bandwidth remains available in order to allow the video content to be clearly recorded by the DVR 106.

If the DVR 106 is not set to record a program and the television 108 is powered down, then the set-top box 104 would go into a passive or standby mode and the DVR 106 may be turned off. During the passive mode, the set-top box 104 may only be activated if the DVR 106 is set to record a program or as activated by a user. For example, a time stamp may be used by power control logic of the set-top box 104 to send an add stream request for the desired content and reactivate the DVR 106 for recording the specified program. Before entering the passive mode, the set-top box 104 may cancel, terminate, or disconnect the content stream provided through the network connection 102 so that the bandwidth available through the network connection 102 may be available to other users or devices that also connect to the network connection 102.

The content stream available through the network connection 102 may be ended by sending a drop stream signal, message, command, or request to the IPTV network or component delivering the content stream. The drop stream request may terminate the content stream delivered to the set-top box 104 so that the bandwidth that was being used to send data such as a television program or video on demand may be used by different elements within the IPTV environment 100 to provide improved bandwidth and/or throughput for the high-speed Internet connection that may be part of the network connection 102. As a result, performance may be enhanced by reallocating bandwidth that may be scarce as part of the network connection 102.

Before the set-top box 104 is powered down, the set-top box 104 takes note of the next program or show that is to be recorded by the DVR 106. As a result, the set-top box 104 may reactivate itself and the DVR 106 from standby in order to record the program using the DVR 106 and insuring that the full bandwidth and content available through the network connection 102 has been restored for active recording. Alternatively, the set-top box 104 may take a snapshot or request a list of all schedule DVR activity at the time the set-top box 104 goes into passive mode for activating and deactivating the set-top box 104 and DVR 106.

Figure 2:
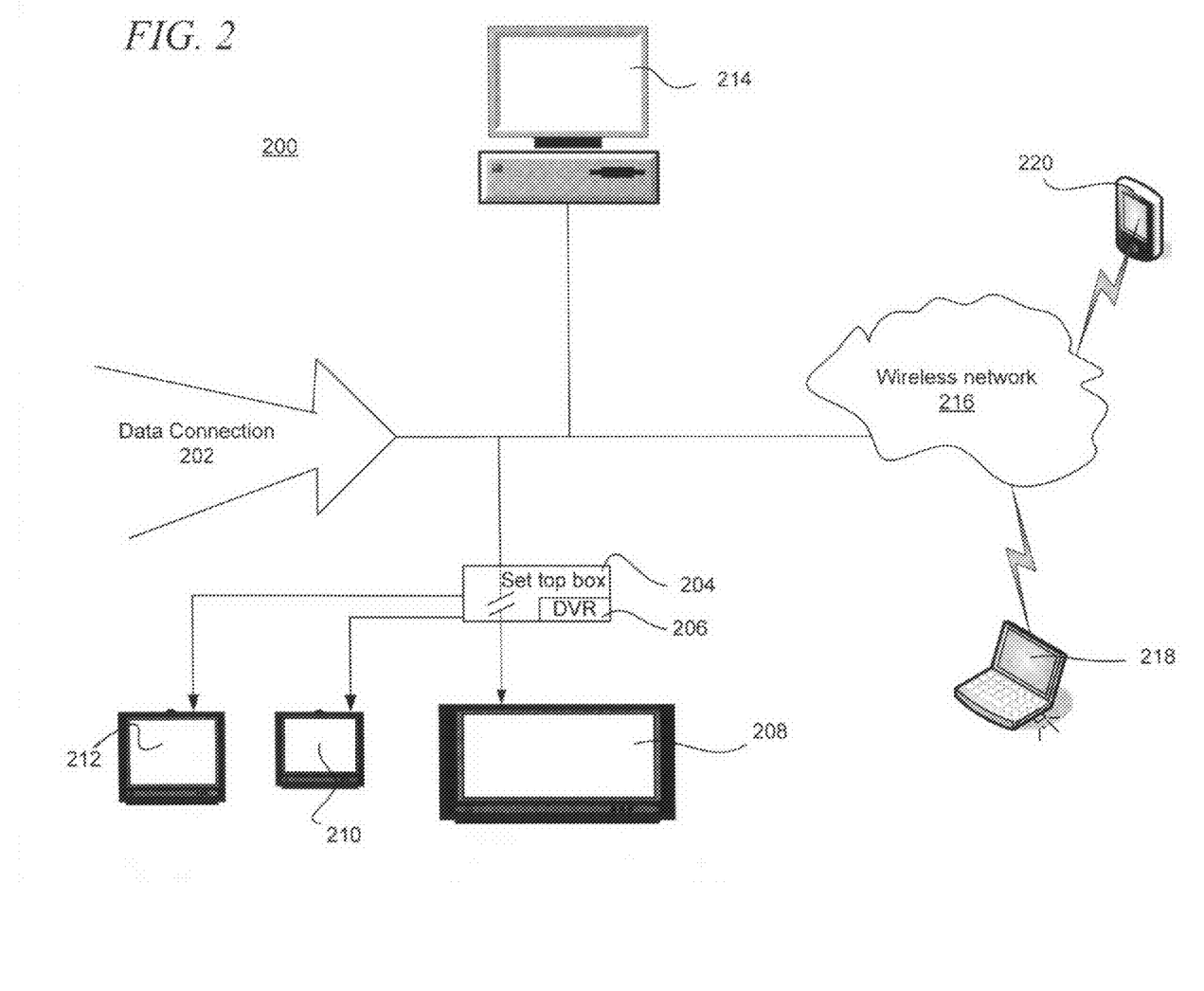
FIG. 2 is an illustrative diagram of a home network in accordance with an illustrative embodiment.

FIG. 2 is an illustrative diagram of a home network in accordance with an illustrative embodiment. FIG. 2 illustrates one embodiment of a home network 200. The home network 200 may include a number of elements, including a data connection 202, a set-top box 204, a DVR 206, televisions 208, 210 and 212, a personal computer 214, a wireless network 216, a laptop 218, and a cellular telephone 220. The data connection 202, the set-top box 204, the DVR 206, and the television 208 are a particular implementation of the IPTV environment 100 of FIG. 1.

As shown in FIG. 2, the data connection 202 may provide video content, packets, information, and data to the set-top box 204 for distribution to the televisions 208, 210 and 212, as well as the personal computer 214 and the wireless network 216. The set-top box 204 may be configured to send add stream requests for each of the televisions 208, 210, and 212.

In one example, the set-top box 204 may request a high-definition MPEG 4 content stream for the television that uses 8 MB. The set-top box may simultaneously process a change channel request that ends one stream and requests another stream for television 210 while television 212 has requested that a separate channel be recorded by the DVR 206. The content streams for the television 210 and 212 may occupy another 3 MB each. As a result, when the set-top box determines that one of the televisions 208, 210, and 212 is not on and the DVR 206 is not recording any content, the bandwidth may be reallocated for providing better performance to the personal computer 214, the wireless network 216, or the other televisions.

The wireless network 216 may further enable communication with the cellular telephone 220 and the laptop 218. Although not further illustrated, the wireless network 216 may include a wireless router or server for sending and receiving data signals to the cellular telephone 220, the laptop, and other household or user devices.

In one embodiment, the set-top box 204 may be enabled to display content to each of the televisions 208, 210 and 212. Before the set-top box 204 and 206 go into a sleep, hibernation, or a passive mode, the set-top box 204 determines the next scheduled recording time for the DVR 206. The scheduled recording time may have been set by any number of users with access to the televisions 208, 210 and 212 or the set-top box 204. Alternatively, the programming for the set-top box may be done through the personal computer 214 or laptop 218 which may communicate directly with the set-top box 204 or communicate through a web or Internet portal available to each of the devices.

Once the televisions 208, 210 and 212 have been powered down, the set-top box 204 determines whether the DVR 206 is recording and the next time for which the DVR 206 is set to record a program. If the DVR 206 is recording for any of the televisions 208, 210 and 212, the data connection 202 remains active or the content stream to the set-top box 204 remains open so that the DVR 206 may continue to record. If, however, the DVR 206 is not set to record for some time, the set-top box 204 powers itself down and cancels the content stream available through the data connection 202. The set-top box 204 may enter a passive mode so that only a minimum amount of power is used to keep track of time and compare the current time against the next scheduled recording. Once the set-top box 204 determines a program needs to be recorded by the DVR 206, the set-top box 204 awakes itself to full functionality and sends an add stream request for the specified content to be recorded by the DVR 206. As a result, the data connection 202 may be used by the personal computer 214 and devices connected to the wireless network 216 in order to insure that these devices have proper availability to bandwidth and are not limited by bandwidth constraints, even when the televisions 208, 210 and 212 have been turned off. For example, the 8 Mb of bandwidth tied to different content streams delivered by the set-top box 204 to the televisions 208, 210, and 212 may be diverted to the personal computer 214, a wireless network 216 for enhanced communication, Internet browsing, and overall performance.

Additionally, the set-top box 204 may cancel a content stream or portions of the content stream dedicated for providing programming for each of the televisions 208, 210 and 212. As a result, as different televisions are powered down, the content stream may be terminated if the DVR is not set to record a specified program. Each time one of the televisions 208, 210 and 212 is powered down and a drop stream request is sent by the set-top box 204 to the IPTV content provider, more bandwidth may be potentially freed up for different uses or applications or be made available on the service provider network.

Once the record time comes for the next specified program as read by the set-top box 204 from the DVR 206, the set-top box 204 reactivates itself and reestablishes the content stream through the data connection 202 so that the DVR 206 may properly record the specified program. In one embodiment, the set-top box 204 may include a time display device that tracks the specified recording times for the DVR and reactivates the set-top box 204 to send add stream requests as programmed by the user. The data connection 202 may have limited bandwidth and by disabling the connection or content stream received by the set-top box 204 when the televisions 208, 210 and 212 are powered down, the data connection 202 may be used by the other devices in the home network 200 preserving bandwidth and increasing customer satisfaction.

Figure 3:
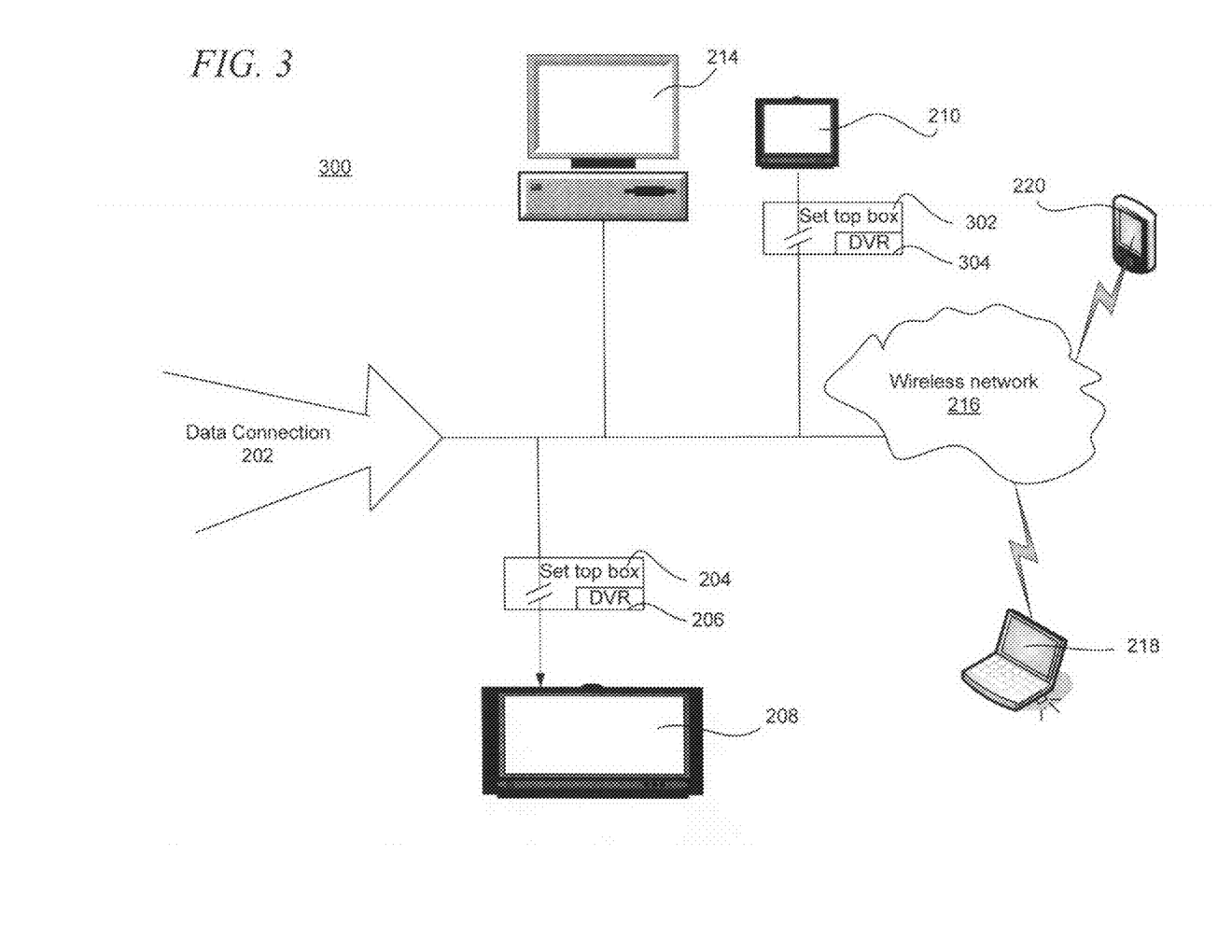
FIG. 3 is an illustrative diagram of a home network in accordance with an illustrative embodiment.

FIG. 3 is an illustrative diagram of a home network in accordance with an illustrative embodiment. The home network 300 of FIG. 3 includes many of the elements of FIG. 2. The home network 300 further includes the set-top box 302 and corresponding DVR 304 which are connected to the television 210. In addition, the set-top box 204 and DVR 206 are connected only to the television 208. The illustrative embodiments may be particularly important for the home network 300 in which multiple set-top boxes 302 and 204 are being used because of the large bandwidth requirements of IPTV.

In this embodiment, the set-top box 302 and set-top box 204 may function as previously described with minor exceptions. If the set-top box 204 determines that the television 208 has been turned off and that the content stream used by the set-top box 204 may be deactivated, the set-top box 204 deactivates the content stream through the data connection 202. However, the set-top box 204 does not send a drop stream request for the stream provide through the data connection 202 to the set-top box 302 and corresponding television 210.

In one embodiment, only the set-top box 302 may determine when the content provided through the data connection 202 may be turned off or disabled for the television 210 in order to preserve bandwidth through the data connection. The set-top box 302 and the set-top box 204 both use their corresponding DVRs 302 and 206 to determine whether the content stream for each should be deactivated once the television 210 and 208 has been powered down by the user.

Figure 4:
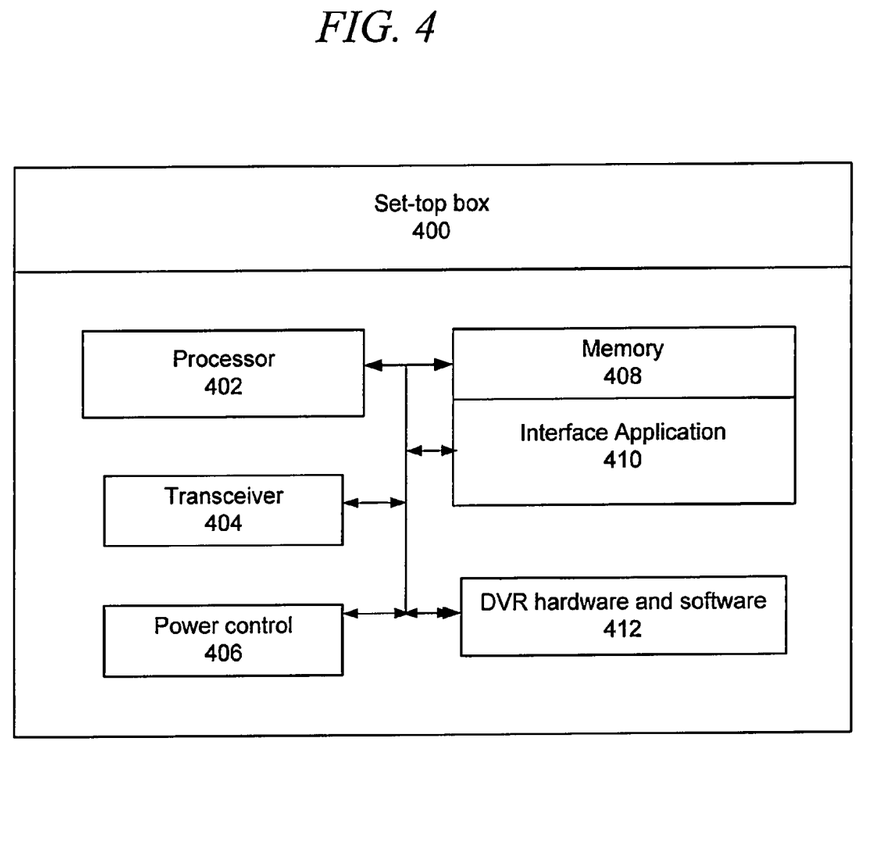
FIG. 4 is a block diagram of a set-top box in accordance with an illustrative embodiment.

FIG. 4 is a block diagram of a set-top box in accordance with an illustrative embodiment. FIG. 4 illustrates one embodiment of a set-top box 400 and is shown for illustration purposes only, and not as a limitation of required elements. The set-top box 400 may include numerous elements including a processor 402, a transceiver 404, a power control 406, a memory 408, an interface application 410, and DVR hardware and software 412.

The set-top box 400 may be a combination of hardware and software elements. The set-top box 400 may incorporate various structures, formats, and hardware/software combinations included in available set-top boxes. The processor 402 may be a computer processor, or other processing device or element used by the set-top box to process instructions, convert and translate data, render video, and otherwise perform data manipulation and processing, as required by the set-top box 400. The memory 408 may include a hard drive and flash memory for storing television programs, data, applications, and user preferences. However, the memory 408 may be any static or dynamic memory type or configuration suitable for storing and accessing electronic information and data. In one embodiment, the memory 408 includes a 500 GB hard drive for storing video images, an operating system, and applications as specified by the user, and a 4 GB SDRAM for processing data and applications.

The transceiver 404 may be configured to communicate with an IPTV service provider or other content provider. The content service provider may provide programming or content that is used by the set-top box 400 to be displayed by a television. The transceiver 404 may configure, format, or translate the content stream for display by a television. The transceiver 404 may also send information to the content service provider that may specify a selected channel or user input or changes thereto. In addition, the transceiver 404 may send a signal informing the content service provider that the set-top box 400 is going to be powered down and therefore the content stream provided to the set-top box may be temporarily deactivated, cut-off, or cancelled in order to preserve bandwidth available through the data connection or IPTV connection. For example, the transceiver 404 may send add and drop stream requests to provide the channels or media content requested by the DVR or one or more connected televisions.

In one embodiment, the interface application 410 is digital logic. In another embodiment, the interface application 410 may be stored in the memory 408 for coordinating communication. The interface application 410 may communicate with the DVR hardware and software 412 to determine whether a program is currently being recorded or the next time the DVR hardware and software 412 needs to record a television program. In one example, the interface application 410 may note a time stamp at which the set-top box 400 needs to be active so that the DVR hardware and software 412 may be activated to record a user-selected program. The interface application 410 may also take a snapshot of all scheduled recording information, including time, date, duration, and channel, for each recording scheduled that may be saved in a matrix form, chart, or other simplified format.

The interface application 410 may also communicate with the television to determine power status or mode. For example, if the television is hibernating, the interface application 410 may send a signal to the power control 400 to turn off the DVR hardware and software 412 and set the set-top box to enter a sleep or standby mode. The interface application 410 may also send and receive messages or data to the content service provider. For example, the interface application 410 may send a message to a content server indicating that the content stream may be terminated because it is no longer being used by the set-top box or DVR hardware and software 412.

The power control 406 may be used to power down the set-top box 400 and the DVR hardware and software 412. In particular, the power control 406 may place the set-top box 400 in a passive mode until it is activated by the user or until a time specified for recording a program is met as received from the interface application 410 or, alternatively, by the DVR hardware and software 412. The power control 406 may completely turn off the DVR hardware and software 412 and most of the set-top box in order to preserve power. The power control 406 may be a chip set that includes a clock and logic for comparing the current time against the next schedule recording time for the DVR hardware and software 412. For example, once the set-top box 400 sends a drop stream request for one or more linked televisions, the power control 406 may power down all other elements of the set-top box 400 until the next scheduled recording time. As previously described, the set-top box 400 may record one or more content streams at a time for multiple televisions sets or for requested programming that runs concurrently.

The power control 406 may allow the set-top box 400 to be activated or deactivated when the interconnected television or televisions are not in use, and the DVR hardware and software 412 does not need access to the content stream to record a program As a result, the power control 406 conserves electricity, as well as enabling the set-top box 400 to conserve bandwidth used by the set-top box 400 to provide video content to the DVR hardware and software 412 and/or to one or more interconnected televisions.

Figure 5:
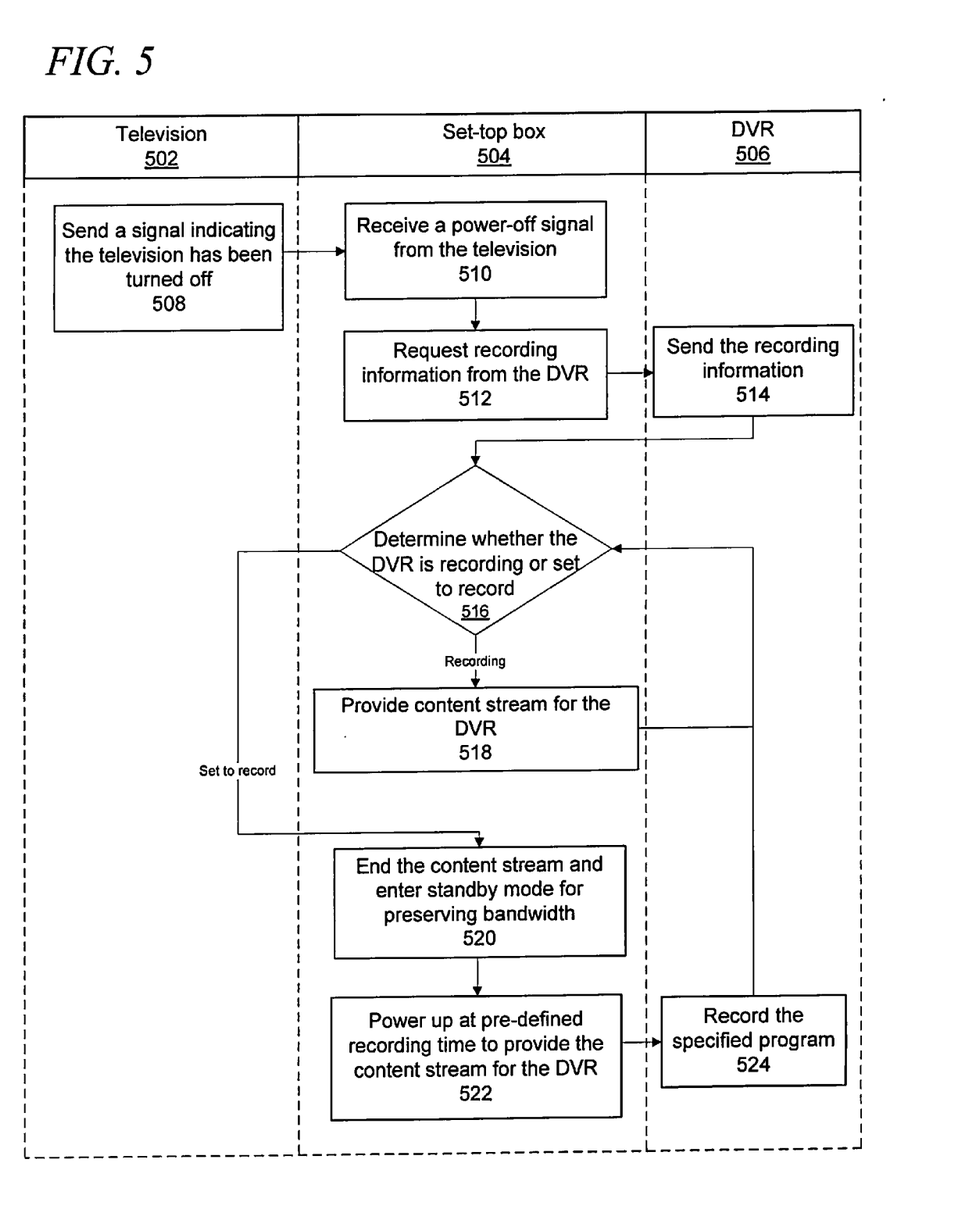
FIG. 5 is a flowchart of a process for dynamic bandwidth allocation in accordance with an illustrative embodiment.

FIG. 5 is a flowchart of a process for dynamic bandwidth allocation in accordance with an illustrative embodiment. The process of FIG. 5 may be implemented by a television 502, set-top box 504, and a DVR 506. The DVR 506 may be integrated with the set-top box 504 or may be an externally linked DVR. The television 502, set-top box 504, and DVR 506 may be linked or communicate through hard-wired or wireless connections. The television 502 may represent one or more televisions in communication with the set-top box. Before the process of FIG. 5 begins an add stream request may have been sent to an IPTV service provider to provide programming for one or more televisions.

The process may be with in the television 502 sending a signal indicating the television has been turned off (step 508). The power down or inactivity signal of step 508 may be sent as the television 502 goes from an active or powered mode to an inactive mode. The signal may be sent actively, such as through an affirmative message, or passively, such as through a current detector of the television.

The set-top box 504 receives the power-off signal from the television (step 510). The set-top box 504 requests recording information from the DVR (step 512). The recording information may specify the recording schedule for the DVR 506 as of the time the power-off signal is received. For example, the recording schedule may list the time, date, channel, and duration for which the programs are to be recorded. The set-top box 504 may particularly request the schedule recording information for the next week.

The DVR 506 sends the recording information (step 514). The recording information may be sent in a format that may be easily stored and read by the DVR 506 and/or the set-top box 504.

The set-top box 504 determines whether the DVR is recording or set to record (step 516). If the set-top box 504 determines the DVR is recording, the set-top box 504 provides the content stream for the DVR (step 518). The content stream continues to be streamed in step 522 so that the DVR 506 may record the specified program without interruption. Next, the set-top box 504 determines whether the DVR is recording or set to record (step 516).

If the set-top box 504 determines the DVR is set to record in step 516, the set-top box 504 ends the content stream and enters standby mode for preserving bandwidth (step 520). The set-top box 504 may send a signal, message, or other communication to a server, switch, router, or other network device of the content service provider in order to end the content stream. For example, the set-top box may send a drop stream request for one or more televisions. By ending the content stream during step 520, the bandwidth of a data connection into a home, business, or organization may be freed up for other computing devices, applications, or usage.

Next, the set-top box 504 powers up at a pre-defined recording time to provide the content stream for the DVR (step 522). During step 522, power logic or a power chipset of the set-top box 504 may power up all other components of the set-top box 504 and send an add stream request to reestablish the content stream through a data connection with the IPTV content service provider. The DVR 506 records the specified program (step 524). The set-top box 504 may determine whether the DVR is recording or set to record (step 516). In one embodiment, when returning to step 516, the set-top box 504 may update or request an update of recording information from the DVR 506.

Figure 6:
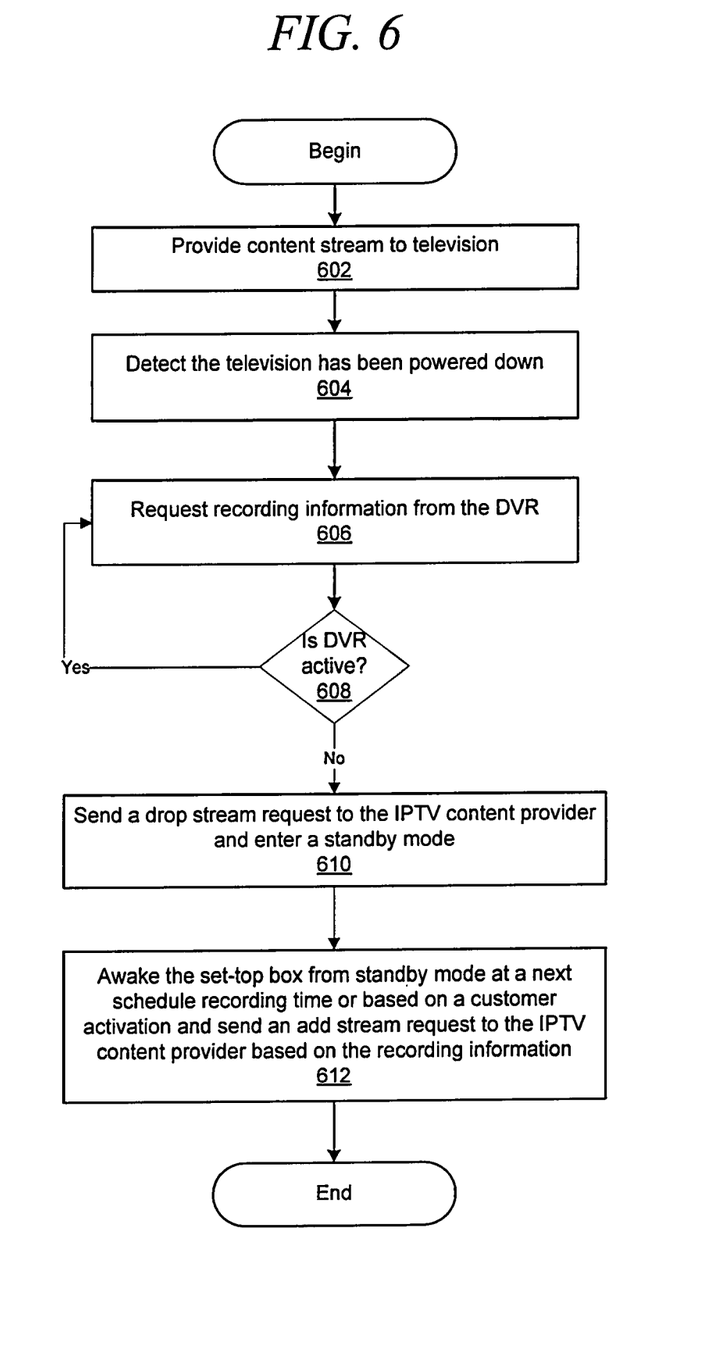
FIG. 6 is a flowchart of a process for managing bandwidth using a set-top box in accordance with an illustrative embodiment.

FIG. 6 is a flowchart of a process for managing bandwidth using a set-top box in accordance with an illustrative embodiment. The process of FIG. 6 may be implemented by a set-top box. The set-top box may include a DVR or DVR functionality. The process may begin by providing a content stream to a television (step 602). The content stream may be used to provide television programming, video, and other media to one or more televisions as requested through an add stream request, message, or command. The DVR of the set-top box may also use the content stream to record and store specified programs.

Next, the set-top box detects the television has been powered down (step 604). The set-top box may detect the change in television status through a current detector, affirmative shut-down signal from the television received through a wired or wireless connection, heart-beat signal, or other detection means.

The set-top box requests recording information from the DVR (step 606). As previously mentioned, the DVR may be integrated with the set-top box or may be externally connected. The recording information may specify the next scheduled recording time if set or specified. The recording information may further include all scheduled recording times or a number of the schedule recording times for a time period, such as a day, week, or month. The set-top box may note the recording time by using a time stamp. For example, the set-top box may note that the next scheduled time is Jun. 21, 2012 at 6:55 p.m. on channel 32 or use a time stamp, such as "d06212012t1855c032".

Next, the set-top box determines whether the DVR is active (step 608). During step 608, the set-top box may determine whether the DVR is recording at the moment or whether it will be recording within a specified period, such as fifteen minutes. If the DVR is active, the set-top box requests recording information from the DVR. The recording information may further specify how long the DVR will be recording a specified program or interactive content.

If the DVR is not active in step 608, the set-top box sends a drop stream request to the IPTV content provider and enters a standby mode (step 610). The drop stream request may be sent to a server, node, head end content provider equipment, or other IPTV network device or application for terminating the content stream. By ending the content stream in step 610, the set-top box preserves dedicated bandwidth through the network connection for other devices of the home, business, or organization, or other customers of the content service provider. The set-top box may also preserve energy by going into the passive mode while the television is not activated and the DVR is not active.

Next, the set-top box awakes the set-top box from standby mode at a next scheduled recording time or based on a customer activation and sends an add stream request to the IPTV content provider based on the recording information (step 612). Once the set-top box goes into passive mode, the set-top box may reactivate itself any number of times based on a time stamp or on the recording information as determined in step 606.

The process of FIGS. 5 and 6 may be implemented for any number of televisions connected to the set-top box. Alternatively, the process may be simultaneously implemented by multiple set-top boxes that share access to a network connection carrying multiple content streams for televisions, computing devices, and other network communicating devices.

The previous detailed description is of a small number of embodiments for implementing the invention and is not intended to be limiting in scope. The following claims set forth a number of the embodiments of the invention disclosed with greater particularity.

What is claimed is:
1. A method for conserving bandwidth for a data connection, the method comprising:
detecting one of a plurality of televisions in direct wireless communication with a set-top box has been turned off utilizing a set-top box, a wireless connection between one of the plurality of televisions and the set-top box indicating the one of the plurality of televisions has been turned off;

requesting recording information associated with the one of the plurality of televisions from a digital video recorder (DVR) integrated with the set-top box; and terminating a content stream corresponding to the one of the plurality of televisions to the DVR and the one of the plurality of televisions to increase available bandwidth to a network in response to receiving the recording information and determining the DVR is inactive for the one of the plurality of televisions, wherein the content stream is one of a plurality of content streams to the plurality of televisions, and wherein the set-top box manages bandwidth for each of the plurality of televisions through the direct wireless communication according to recording information and an activity status associated with each of the plurality of televisions; and reallocating the increased available bandwidth to one or more other of the plurality of content streams to provide better performance for one or more other connected and active televisions of the plurality of televisions.

2. The method according to claim 1, further comprising: reenabling the content stream to the DVR of the set-top box by sending an add stream request in response to determining a program is set to record at a current time.

3. The method according to claim 2, wherein DVR hardware of the set-top box is shut down to conserve power in response to the DVR not being utilized or scheduled to be utilized, and wherein reenabling includes reactivating the set-top box.

4. The method according to claim 1, wherein the detecting comprises:

receiving a power down message in the wireless connection from the one of a plurality of televisions indicating the one of the plurality of televisions has been turned off, wherein each of the plurality of televisions communicates a heartbeat signal utilizing the wireless connection to the set-top box indicating the activity status is active or inactivate, and wherein the set-top box terminates a content stream for each of the plurality of televisions in response to determining the corresponding plurality of televisions are inactive.

5. The method according to claim 1, wherein the set-top box reactivates the plurality of content streams according to the recording information.

6. The method according to claim 1, wherein the recording information specifies a recording date, a recording time, a recording duration, and channel, and wherein the recording information specifies the recoding information for all currently scheduled recordings for each of the plurality of televisions.

7. The method according to claim 1, wherein the content stream is sent through the wireless connection directly communicated between each of the plurality of televisions and the set-top box.

8. The method according to claim 1, wherein terminating further comprises:

sending a drop stream request to an Internet Protocol television (IPTV) content server to terminate the content stream.

9. The method according to claim 7, wherein the wireless connection between the plurality of televisions and the set-top box occurs through a WiFi connection or a Bluetooth connection.

10. The method according to claim 4, wherein terminating further comprises:

entering a standby mode for the set-top box until a next scheduled recording time as specified by the recording information or until the television is turned on by a user in response to the plurality of televisions being in an inactive status and the DVR being unused.

11. An IPTV set-top box for preserving bandwidth, the set-top box comprising:

a transceiver configured to receive content streams from a service provider and format the content streams for display by a plurality of televisions, wherein the IPTV set-top box and the plurality of televisions communicate directly through a wireless connection;

a DVR configured to record programs from the content streams for playback by any of the plurality of televisions as specified by a user;

an interface application configured to request recording information from the DVR, wherein the interface application sends a message to terminate a content stream within the content streams to one of the plurality of televisions to increase available bandwidth to a network in response to receiving an indicator through the wireless connection indicating the one of the plurality of televisions is turned off and further in response to the recording information being associated with inactivity of the DVR for the one of the plurality of televisions, wherein the interface application manages bandwidth for each of the plurality of televisions through the direct wireless connection according to the recording information and an activity status associated with each of the plurality of televisions, and wherein the interface application reallocates the increased available bandwidth to one or more other of the plurality of content streams to provide better performance for one or more other connected and active televisions of the plurality of televisions; and a power control operable to initiate a passive mode of the set-top box in response to inactivity of the DVR and the plurality of televisions.

12. The IPTV set-top box according to claim 11, wherein the interface application reestablishes the content stream and activates the DVR to record a program from an inactive state based on the recording information.

13. The IPTV set-top box according to claim 11, wherein each of the plurality of televisions directly communicates a heartbeat signal through the wireless connection to the set-top box indicating the activity status is active or inactivate and, wherein the set-top box terminates the content streams for each of the plurality of televisions in response to inactivity of the DVR for each of the plurality of televisions and the inactive status for each of the plurality of televisions.

14. The IPTV set-top box according to claim 13, wherein the recording information specifies the recording information for all currently scheduled recordings, and wherein the recording information specifies a recording date, a recording time, a recording duration, and channel for each of the currently scheduled recordings.

15. The IPTV set-top box according to claim 14, wherein the power control receives a message from each of the plurality of televisions or a current indicator through the wireless connection indicating one of the plurality of televisions is being powered down.

16. An IPTV set-top box for preserving bandwidth comprising:

a processor for executing a set of instructions; and
a memory for storing the set of instructions, wherein the set of instructions are configured to:

detect one of a plurality of televisions in direct wireless communication with a set-top box has been turned off, request recording information associated with the one of the plurality of televisions from a digital video recorder (DVR) integrated with the IPTV set-top box, terminate a content stream corresponding to the one of the plurality of televisions to the DVR and the one of the plurality of televisions to increase available bandwidth to a network to increase available bandwidth to a network in response to receiving the recording information determining the DVR is inactive for the one of the plurality of televisions, and reenable the content stream to the DVR through the set-top box in response to determining a program is set to record at a current time, wherein the content stream is one of a plurality of content streams to the plurality of televisions, wherein a wireless connection between one of the plurality of televisions and the set-top box indicating the one of the plurality of televisions has been turned off, and wherein the set-top box manages bandwidth for each of the plurality of televisions through the direct wireless communication according to recording information and an activity status associated with each of the plurality televisions; and reallocate the increased available bandwidth to one or more other of the plurality of content streams to provide better performance for one or more other connected and active televisions of the plurality of televisions.

17. The IPTV set-top box according to claim 16, wherein the set of instructions further reactivates the set-top box and the corresponding DVR, reenables the content stream to the DVR and records the program in response to determining the program is set to record at the current time.

18. The IPTV set-top box according to claim 16, wherein the set of instructions further prevents the content stream from terminating in response to determining the DVR is active or will be active within a threshold time period.

19. The IPTV set-top box according to claim 16, wherein the set-top box communicates the content stream directly with each of the plurality of televisions through the wireless connection, and wherein the content streams are terminated only if the plurality of televisions are inactive and the DVR is inactive.

20. The IPTV set-top box according to claim 19, wherein each of the content streams is terminated separately when the associated one of the plurality of televisions is deactivated and the DVR is not utilizing each of the associated content streams.

21. The set-top box according to claim 16, wherein the set of instructions reactivates the set-top box and the DVR based on a time stamp from the recording information.

* * * * *